United States Patent [19]
Pasculle et al.

[11] 4,041,543
[45] Aug. 9, 1977

[54] FIELD PROTECTOR FOR SYNCHRONOUS MACHINES

[75] Inventors: Maurice J. Pasculle; Edgar F. Merrill, both of Pittsburgh; Carl J. Heyne, Allison Park, all of Pa.

[73] Assignee: Westinghouse Electric Corporation, Pittsburgh, Pa.

[21] Appl. No.: 561,725

[22] Filed: Mar. 25, 1975

[51] Int. Cl.[2] .............................................. H02H 7/09
[52] U.S. Cl. .................................. 361/33; 310/68 R; 361/124
[58] Field of Search ................ 317/13 R, 13 B, 13 A, 317/61, 61.5, 66; 337/19, 28; 322/28; 310/68 R, 68 C, 68 D, 68 B

[56] References Cited
U.S. PATENT DOCUMENTS

| | | | |
|---|---|---|---|
| 1,049,366 | 1/1913 | Jackson | 317/61 |
| 1,212,129 | 1/1917 | Chernyshoff | 317/61.5 |
| 1,287,244 | 12/1918 | Creighton | 317/13 R |
| 1,457,249 | 5/1923 | Janson et al. | 317/66 |
| 1,834,786 | 12/1931 | Kacser | 322/28 |
| 2,430,206 | 11/1947 | Beck et al. | 337/19 |
| 3,435,290 | 3/1969 | Lyman | 317/13 R |
| 3,723,794 | 3/1973 | Spisak et al. | 310/68 D |
| 3,849,704 | 11/1974 | Streater | 317/13 R |
| 3,898,533 | 8/1975 | Scudner, Jr. | 317/61.5 X |

Primary Examiner—J D Miller
Assistant Examiner—Patrick R. Salce
Attorney, Agent, or Firm—G. H. Telfer

[57] ABSTRACT

Apparatus for overvoltage protection of the field winding of a synchronous dynamoelectric machine. A protective spark gap device is electrically connected in parallel across the field winding of the machine and is designed to weld itself into a short-circuit when the voltage across the field winding increases to an unacceptable value. The weldable spark gap provides a positive indication of problems in the field circuit and at the same time protects the field circuit from damage from continued operation. The protective spark gap is not self-restoring and therefore must be removed and replaced before operation is resumed.

7 Claims, 6 Drawing Figures

FIELD PROTECTOR FOR SYNCHRONOUS MACHINES

BACKGROUND OF THE INVENTION

1. Field of the Invention

This invention relates to protective devices for dynamoelectric machines and in particular to a weldable spark gap device for overvoltage protection of a synchronous motor.

2. Description of the Prior Art

Certain protective features are generally included within a motor or as part of a motor controller to prevent damage to the motor resulting from unusual operating conditions. For example, where an increase in voltage will cause damage to electric or mechanical apparatus, it is necessary to use some form of overvoltage protection.

A serious condition arises during the starting operation of a synchronous motor which requires overvoltage protection for the field winding. Since the synchronous motor is not inherently self-starting, it must be brought up to speed by some auxiliary means, and then connected across the line. Conventional synchronous motor designs employ pole mounted amortisseur windings and relay on induction motor principles for starting and accelerating the motor to synchronous speed. A.C. voltage applied to the stator windings creates a rotating magnetic field, and a very high voltage on the order of several thousand volts will be induced into the field circuit by transformer action if the field circuit is open circuited. The rapid build-up of this high voltage on the field circuit causes flashing over in the field winding which results in burning, shorting and grounding. The field winding must therefore be short circuited through a resistor or otherwise protected to limit the voltage across the field winding to a safe value.

The overvoltage condition will also occur during synchronous operation if the machine loses its DC excitation and pulls out of synchronism. The synchronous motor starts from stand still and accelerates to synchronous speed. When the motor approaches synchronous speed the field circuit is closed to a DC supply and the field discharge resistor is disconnected from the field. The rotor then turns in synchronism with the uniform rotating magnetic field produced by the stator winding. The direct current field excitation produces north and south poles on the rotor which rotate at a synchronous speed and are locked in synchronism with the synchronous rotating field of the stator. If for some reason the machine loses its DC excitation, it will pull out of synchronism and revert back to its transient starting characteristics. The high voltages will be impressed across the field but with the field discharge resistor disconnected. In this situation extensive damage to the rotor circuit will result if no protection is provided.

Synchronous machine protection has been limited primarily to overload and overvoltage protection of the stator winding. Some attempts have been made, however, to protect the rotor field winding with conventional, self-restoring spark gap devices mounted between collector rings. Conventional spark gap devices are well known in the art and are in general usage. In operation they are very similar, if not equivalent, to devices called lightning arrestors, the purpose of each being to protect electrical equipment from damage due to excessive electrical potentials which may be induced by lightning or other causes. In general, such devices comprise a pair of electrodes which are spaced apart to form a small gap. The gap prevents the flow of current between the electrodes so long as the voltage potential across them is less than a predetermined value, commonly referred to as the breakdown potential of the device. When the electrical potential across the gap exceeds the breakdown potential, the gas in the gap is ionized, producing a discharge current which flows across the gap between the electrodes thereby passing the induced electrical charge to ground and preventing the induced charge from reaching and damaging the equipment attached to the electrodes.

The electrode spacing and the structure of the confronting electrode surfaces are designed in conventional spark gap devices so that it does not interfere with the operation of the equipment to which it is attached. Thus, while conditions are normal, the conventional spark gap device is an insulator or at least is a very poor conductor, so that it prevents flow of system current through it. When a transient voltage appears that might exceed the strength of the insulation to be protected, the spark gap quickly becomes a good conductor and thus a good bypass for the surge current. The conventional, self-restoring spark gap device may be looked upon as a very fast switch or circuit breaker connected around the insulation to be protected. It is a breaker that is normally open but is able to close immediately when a transient voltage of a predetermined magnitude appears, and then is able to re-open speedily after a transient voltage has disappeared.

A problem associated with the use of a conventional self-restoring spark gap for protection of the field winding of a synchronous motor is that the gap can arc without operator knowledge. An arc will burn away the gap electrodes and increase the spacing which will change the calibration of the gaps. If the contacts burn enough to appreciably widen the gap, the field insulation of the machine's rotor may not be able to withstand the arc overvoltage required to breakdown the larger gap. Furthermore, such self-restoring spark gaps do not provide a non-reversible signal of malfunction in the field winding connections or in the control circuitry.

SUMMARY OF THE INVENTION

The present invention provides a protective spark gap which is especially adapted for applications where protection is required against high voltage surges and heavy currents which may flow through the gap for appreciable periods of time. The invention includes a pair of electrodes which are arranged to break down and become conducting upon the occurrence of a predetermined overvoltage, and to weld together to form a continuous metallic path which is capable of carrying heavy currents without overheating and without continued arcing. Since the spark gap welds together it is not self-restoring and therefore must be replaced after it has operated thus providing positive indication of a system malfunction.

The invention comprises a pair of flat, relatively thick metal electrodes which have planar sparking surfaces and an annular insulating spacer member separating the electrodes with the sparking surfaces closely spaced so that the electrodes are capable of welding together when a heavy current is discharged. The electrodes are completely enclosed within an expansion chamber whose volume is large as compared to the volume of the space between the sparking surfaces. The expansion chamber is necessary so that when a heavy current discharge occurs, the heated gas and metal vapor in the restricted space between the electrodes can expand into the chamber and relieve the pressure in the sparking space thereby allowing the welding of the electrodes to occur rapidly and uniformly. To further relieve the pressure in the sparking space, the chamber is provided with a small vent opening to exhaust heated gases and metal vapors.

Since the electrodes are intended to weld together when the gap operates, they are closely spaced, the exact spacing depending upon the desired breakdown voltage. It is further desired that the welded interconnection formed by the fused electrodes be relatively large so as to be able to carry heavy discharge currents without overheating or melting. Thus the confronting sparking surfaces of the electrodes are substantially planar and are arranged in a parallel facing relationship so that the spark path lies within a uniform electric field. Corona discharge and other non-uniform field edge effects are minimized by rounding all edges and breaking all sharp corners. The provision of the uniform electric field path in combination with the vented expansion chamber maximizes the surface area over which sparking occurs and thereby produces a large, uniformly welded metal deposit as the metal vaporizes and condenses within the sparking gap.

BRIEF DESCRIPTION OF THE DRAWING

The invention will be more fully understood from the following detailed description of the preferred embodiment, taken in connection with the accompanying drawing, in which.

DESCRIPTION OF THE PREFERRED EMBODIMENT

Figure 1:
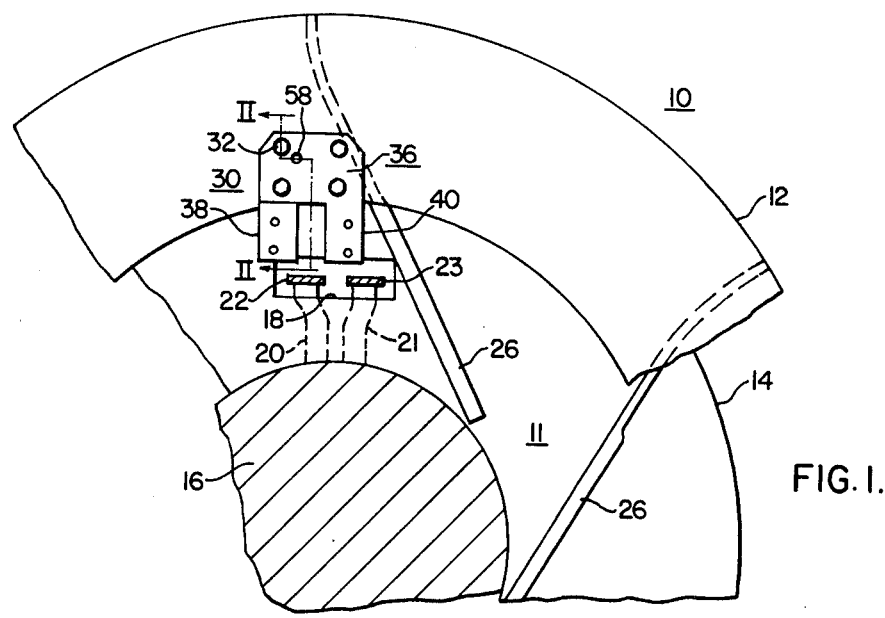
FIG. 1 is a partial front elevational view of a blower assembly for a synchronous AC motor to which a spark gap field protector, constructed according to the teachings of the present invention, is secured.

Throughout the description which follows, like reference characters refer to like elements in all figures of the drawings.

The present invention is concerned primarily with overvoltage protecting means for the windings of dynamoelectric machines, and it has particular advantages in synchronous motors. Accordingly, in the description which follows the invention is embodied in a large synchronous motor of the brushless type. It should be understood, however, that the spark gap protective device of the present invention may be utilized as overvoltage protective means for any type of electrical load.

In FIG. 1 the invention as shown, by way of illustration, disposed in operating position within a blower assembly 11 of a large synchronous motor 10. The motor 10 may have any number of poles and may be a single phase or polyphase synchronous machine of almost any rating, but for purposes of the present description it may be considered to be a two pole 60 Hz three phase brushless synchronous motor having a rating in the excess of 100 horsepower. The motor 10 may take any form of usual construction which embodies the same or similar features.

As shown in FIG. 1, the blower 11 has an outer shroud member 12 which surrounds an inner supporting member 14 in concentric relationship. The inner supporting member 14 is pressed upon a shaft 16 which also supports a rotor assembly and an alternating current exciter (not shown). A cut out opening 18 is formed within the supporting member 14 to allow passage of field coil leads 20 and 21 from field connectors 22, 23 to a field winding (not shown). A plurality of fan blades 26 are symmetrically disposed between the supporting member 14 and the shroud 12 in the usual manner. In this system air is circulated by the blower 11 in order to cool the rotor, the exciter, and stator members (not shown) as the shaft 16 rotates. It is to be understood that this particular structure is shown only by way of illustration to indicate one type of machine to which the present invention is applicable, and any suitable or desired construction for the synchronous motor may be used.

Figure 2:
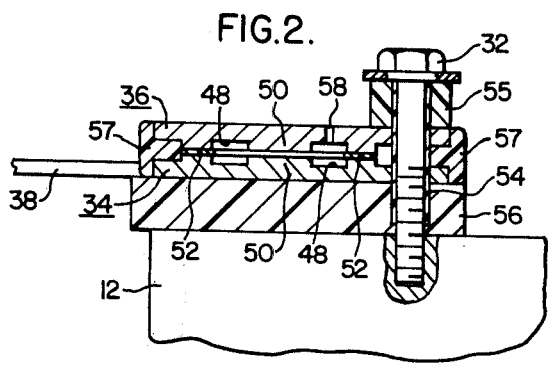
FIG. 2 is a sectional view of the spark gap of FIG. 1 taken on line II—II.

A protective spark gap 30 constructed according to the teachings of the present invention is secured to the shroud assembly 12 by means of through bolts 32 as illustrated in FIGS. 1 and 2, and rotates with the blower 11. In a preferred embodiment of the invention, the protective spark gap device comprises two closely spaced metal electrodes 34 and 36, which are made of a consumable metal, such as brass. By the term "consumable metal" it is meant a metal of the type which readily vaporizes in response to heat generated by an electrical arc discharge. Metal other than brass may be used to good advantage.

The electrodes have terminal connecting portions 38 and 40 respectively for electrical connection to the field coil leads 20 and 21. The connection between the terminal portions and the coil leads may be made by any suitable means, for example, by means of copper straps (not shown) which may be bolted to the terminal portions by means of lock bolts (not shown) which pass through the openings 44 of each terminal portion. Each electrode has an annular recess 48 centrally disposed to define and to isolate a disc shaped sparking portion 50 which has a planar sparking surface 51. The electrodes are separated and accurately spaced apart by an annular washer 52 of mica, or other suitable insulating material, which insulates the electrodes from each other under normal condition. The mica washer 52 is shown disposed between annular shoulder portions 42. An epoxy filler 57 is applied to the assembly to seal the union of the electrodes 34, 36 and washer 52.

The electrodes and annular washer are held in assembled relation by means of the through bolts 32 which pass through suitable openings 46 and engage the shroud 12. A micarta bushing 55 and an insulating sleeve 54 serve to insulate the through bolts 32 from the electrodes 34 and 36. The spark gap 30 is insulated from the shroud 12 by means of a micarta block 56 which is disposed between the spark gap and the shroud and is compressed by the through bolts 32.

Since the electrodes are intended to weld together when the gap operates, they are closely spaced, the exact spacings depending, of course, upon the desired breakdown voltage. Thus in a typical embodiment of the invention, the thickness of the mica washer 52 may be made such that the sparking surfaces 51 of the electrodes 34 and 36 are spaced apart a distance of the order of 20 mils, so that the gap breaks down on a voltage of the order of 1200–1300 volts. When a voltage in excess of the predetermined breakdown voltage appears across the gap, it will commence discharging, and with the heavy discharge current, the sparking surfaces 51 of the electrodes 34 and 36 will weld together almost immediately so that the heavy current is discharged through a continuous metallic path and the device does not become overheated and no continued arcing or emission of flame occur.

Figure 3:
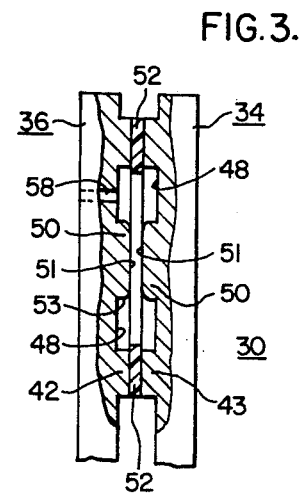
FIG. 3 is a side elevational view, partly in section, of the field protector of FIG. 1.

When the electrodes and spacing washer are placed in assembled relation as shown in FIG. 3, an expansion chamber is formed by the annular recesses 48. Upon the occasion of a heavy current discharge, heated gas and metal vapor in the restricted space between the sparking surfaces of the electrodes increase in pressure very rapidly because of the high temperature generated, and because of vaporization of the metal. The expansion chamber allows these heated gases and metal vapors to expand and relieve the pressure in the sparking area, and welding of the electrodes occurs rapidly. To further relieve the build-up of pressure, a vent 58 is provided which is in fluid communication with the chamber 48 and the atmosphere. If the expansion volume and vent are not provided, the pressure between the electrodes cannot be relieved and rapidly builds up to such a high level that welding of the electrodes is prevented, and the arc travels around between the electrodes causing excessive heating and emission of flame from the gap.

The sparking portions 50 of each electrode have relatively large surface areas 51 so as to be able to carry heavy discharge currents, and they are preferably made relatively thick and massive so as to have high thermal capacity. The planar sparking surfaces 51 should be large and flat to ensure that the spark path lies within a uniform electric field so that the sparkover voltage is a function of the electrode spacing only and is independent of other dimensions of the device. Accordingly, the edges 53 of the sparking portions 50 are rounded to prevent corona and other edge effects. The annular recess 48 of each electrode also serves to increase the creepage distance between the sparking portions 50 and to prevent discharges between it and the annular shoulder support portion 42 for the annular washer. The arc discharges are therefore confined to the centrally disposed planar sparking surfaces 51 of the sparking portions 50.

By making the planar sparking surfaces relatively large as compared to the spacing between the electrodes, a large welded connection is formed which is capable of conducting large induced load currents without melting. In one particular embodiment of the invention, electrodes having a planar sparking area of ⅜ inch diameter and spaced apart 20 mils commenced discharging at approximately 1400 volts direct current. The electrodes of this gap welded together substantially immediately upon the occurrence of the discharge and conducted 300 amperes for approximately 40 seconds without excessive heating and without noticeable arcing.

Figure 4:
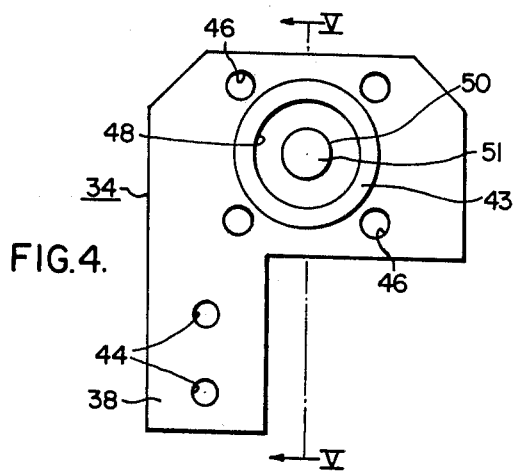
FIG. 4 is a top view of a single electrode assembly.
Figure 5:
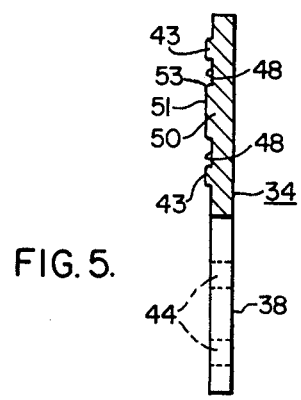
FIG. 5 is a sectional view of the electrode assembly of FIG. 4 taken along the line V—V.

Further details of a typical electrode are illustrated in FIGS. 4 and 5.

Figure 6:
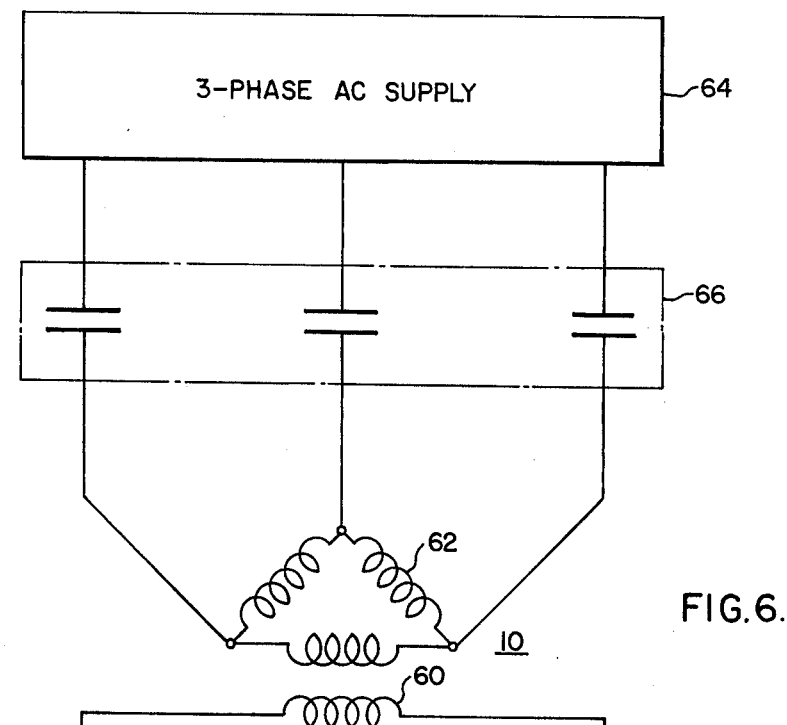
FIG. 6 is a simplified circuit diagram of a synchronous motor having a DC field winding across which the spark gap protector of FIG. 1 is connected.
Figure 6:
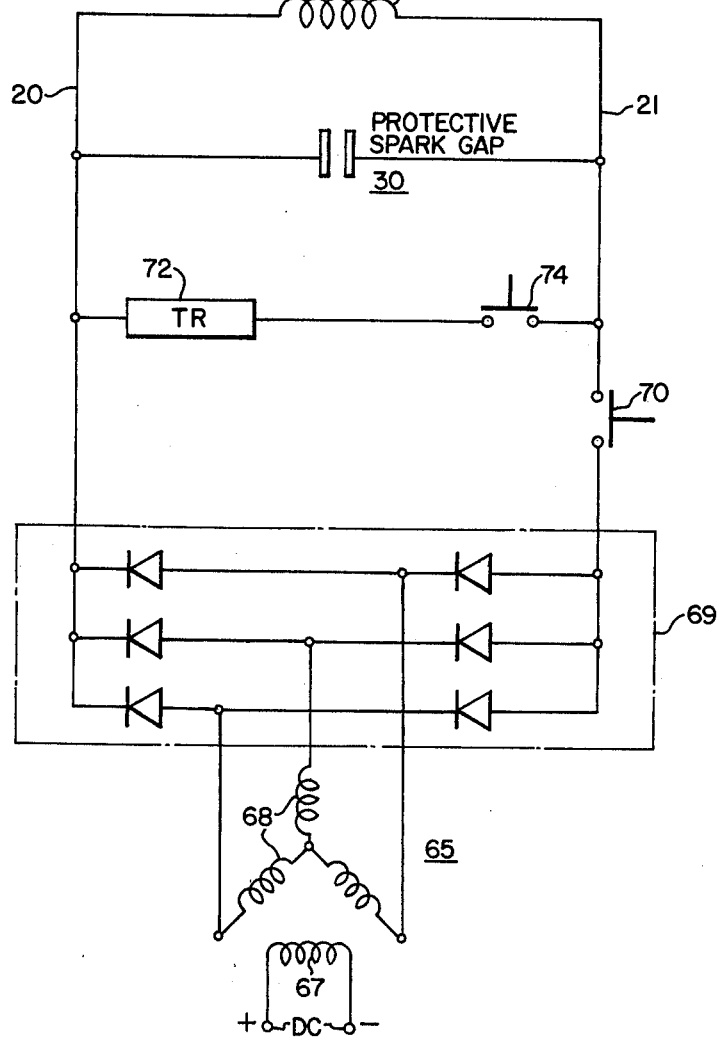

A simplified circuit diagram of the brushless synchronous motor 10 in combination with the protective spark gap 30 is illustrated in FIG. 6 of the drawing. The synchronous motor 10 has a DC field winding 60 and a three phase stator winding 62 which may be wound in a delta configuration, as shown. The stator winding 62 is energized by a three phase alternating current supply 64 through an electrical contactor assembly 66. Excitation for the field winding 60 is provided by an alternating current exciter 65 which has a field winding 67 on its stator excited with direct current from any suitable source. The exciter 65 has an armature winding 68, shown as a three-phase winding, carried on the rotor so as to be rotatable with the field winding 60 of the motor. The armature winding 68 is connected to a rectifier bridge circuit 69 to provide direct current output for excitation of the field winding 60. The exciter armature winding 68, the rectifier 69 and the field winding 60 are all carried on the same shaft, or are otherwise rotatable together on a common rotating member.

The synchronous motor 10 is started by applying an alternating current voltage to the stator winding 62 with the field winding 60 short-circuited through a discharge resistor 72 and a switch 74. The field discharge resistor 72 is preferably composed of thyrite and serves to limit the voltage across the field winding 60 during the transient period when the synchronous motor 10 is being brought up to speed. When the motor approaches synchronous speed, the field circuit is closed to the rectifier circuit 69 through the switch 70, and the switch 74 is opened thereby disconnecting the field discharge resistor 72 from the field circuit. The magnetic poles formed by the energized field winding 60 are pulled into synchronism with the rotating field produced by the stator winding 62 and the synchronous machine 10 operates as a synchronous motor. If for some reason, e.g., because of operator error or because of equipment failure, the machine should lose its DC excitation it would pull out of synchronism and revert back to its transient starting characteristics and a very high voltage would be impressed across the field winding 60, but now with the field discharge resistor 72 disconnected. It is in this situation that extensive damage results to the field winding if overvoltage protection is not provided. In the circuit of FIG. 6 the protective spark gap 30 is electrically connected in parallel across the field winding 60 and operates to short-circuit the field winding when the above condition occurs and collapses the induced voltage. The electrodes 34, 36 of the protective spark gap 30 weld together and become a permanent short-circuit across the field. In this condition the motor 10 will run in an asynchronous mode until some protective device such as a power factor relay (not shown) opens the contactor 66 thereby disconnecting the three phase AC power supply 64 from the stator winding 62.

Attempts to restart the synchronous motor 10 will result in repeating the cycle just described. This will indicate to an operator that a malfunction has occurred and that the motor 10 cannot be synchronized. Operation of the protective spark gap 30 may be confirmed by measuring the resistance across the field winding; if the spark gap has welded into a short-circuit the resistance across the field winding 60 will be zero, and if it has not operated, the DC resistance of the field winding 60 will appear. Of course, once the protective spark gap 30 welds and short-circuits the field winding 60, it must be replaced. However, this is not objectionable since operation of the spark gap occurs relatively infrequently, and as a result of known conditions which can cause catastrophic failure of the field winding 60.

The protective spark gap 30 is preferably secured directly to the rotating structure of the synchronous machine 10 and is connected across the field leads as close to the coil connectors 22, 23 as is physically possible, rather than being connected within an external controller network. In this manner, the spark gap cannot be disconnected and indavertently by an operator or by equipment failure within the controller network.

The protective spark gap 30 provides a positive indication of problems within the field circuit and at the same time protects the field circuit from damage. Conventional self-clearing spark gaps do not provide a non-reversible signal of malfunction in the field winding connections or control circuitry. The protective spark gap 30 will require the operator to shut the synchronous machine down and inspect the rotor circuits to determine the cause of the machine malfunction. Significant delays in resumption of motor operation may be avoided if the protective spark gap is installed in an accessible location such as upon the blower assembly as illustrated in FIG. 1.

Contamination of the sparking surfaces 50 is virtually eliminated since the gap portion is protected inside the main body formed by the two electrodes 34, 36 and mica washer 52.

Because the protective spark gap 30 can conduct very heay currents for extended periods, there is ample time for other protective devices such as a power factor relay to take the machine off the line and assure protection of the field circuit during this period or during any attempted restart.

A specific embodiment of the invention has been shown and described for the purpose of illustration, but it will be apparent that various modifications and other constructions are possible within the scope of the invention, and it to be understood, therefore, that the invention is not limited to the specific embodiment shown, but in its broadest aspects it includes all equivalent modifications and embodiments which come within the scope of the appended claims.

What is claimed is:

1. In a dynamoelectric machine of the type in which a rotating magnetic field causes a voltage to be induced within a winding, the combination with said winding of a weldable spark gap electrically connected in parallel with said winding, said spark gap having a plurality of electrodes which are closely spaced to weld together when the voltage induced in said winding exceeds a predetermined safe operating level.

2. The combination defined in claim 1 in which said dynamoelectric machine is a brushless synchronous motor having a rotor member upon which said winding is disposed, said combination including an alternating current exciter and rectifier means rotatable with said rotor member and electrically connected together to provide a direct current output to said winding, said spark gap being mechanically secured to said rotor member for concurrent rotation therewith.

3. The combination defined in claim 2, said rotor member including a pair of connecting leads for conducting direct current from said rectifier to said winding, and a blower assembly for ventilating said motor, said blower having a shroud with portion defining an axial passageway for admitting said convecting leads, said spark gap being mechanically secured to said shroud adjacent to said passageways said electrodes being electrically connected to said winding leads.

4. The subject matter of clam 1 wherein:
said electrodes of said weldable spark gap comprise a pair of electrodes disposed in confronting parallel spaced relation thereby defining a uniform spark gap therebetween, each electrode comprising a terminal connecting portion, a projecting disc sparking portion and an annular shoulder portion, said projecting disc sparking portion being disposed within said annular shoulder portion and separated therefrom by an annular groove, the disc sparking portion of each said electrode having a circumferential side surface and a continuous planar sparking surface of a diameter of which is very large as compared to the maximum spacing distance at which the electrodes will be used, each said planar sparking surface being joined with said side surface by a rounded edge portion having a predetermined radius of curvature to minimize edge effects whereby a uniform electric field is established between said space sparking surfaces when said electrodes are energized.

5. The subject matter as defined in claim 4,
at least one of said electrodes having portions defining an expansion chamber, said expansion chamber surrounding said sparking surfaces and being in fluid communication with the space between said planar sparking surfaces, the volume of said chamber being large as compared to the volume of said spark gap space; and,
at least one of said electrodes having portions defining a vent, said vent being in fluid communication with said expansion chamber and with the surrounding atmosphere.

6. The subject matter as defined in claim 4 including securing means for holding said electrodes together in said spaced relation, and means for electrically connecting said electrodes in parallel to said load.

7. The subject matter as defined in claim 4, said electrodes being composed of a consumable metal which vaporizes in response to heat generated by an electrical arc between said sparking surfaces, said vaporized metal being transported by said arc to form a welded connection between said sparking surfaces, said sparking surface areas being sufficiently large to form a permanent welded connection which is capable of conducting current of a predetermined magnitude through said load without melting.

* * * * *